US012573559B2

(12) United States Patent
Tsurubayashi et al.

(10) Patent No.: US 12,573,559 B2
(45) Date of Patent: Mar. 10, 2026

(54) ELECTRONIC COMPONENT

(71) Applicant: KYOCERA Corporation, Kyoto (JP)

(72) Inventors: Daiki Tsurubayashi, Kirishima (JP);
Kenta Nakashima, Kirishima (JP);
Tatsuya Suzuki, Kirishima (JP);
Hisashi Sato, Kirishima (JP)

(73) Assignee: KYOCERA CORPORATION, Kyoto
(JP)

( * ) Notice: Subject to any disclaimer, the term of this
patent is extended or adjusted under 35
U.S.C. 154(b) by 0 days.

(21) Appl. No.: 19/225,037

(22) Filed: Jun. 2, 2025

(65) Prior Publication Data

US 2025/0292964 A1     Sep. 18, 2025

Related U.S. Application Data

(63) Continuation-in-part    of    application    No.
PCT/JP2024/043653, filed on Dec. 10, 2024.

(51) Int. Cl.
| | |
|---|---|
| *H01G 4/232* | (2006.01) |
| *H01G 2/06* | (2006.01) |
| *H01G 4/008* | (2006.01) |
| *H01G 4/012* | (2006.01) |
| *H01G 4/224* | (2006.01) |
| *H01G 4/30* | (2006.01) |

(52) U.S. Cl.
CPC ............. *H01G 4/232* (2013.01); *H01G 2/065*
(2013.01); *H01G 4/008* (2013.01); *H01G*
*4/012* (2013.01); *H01G 4/224* (2013.01);
*H01G 4/30* (2013.01)

(58) Field of Classification Search
CPC ........... H01G 4/012; H01G 4/232; H01G 4/30
See application file for complete search history.

(56) References Cited

U.S. PATENT DOCUMENTS

| | | | | |
|---|---|---|---|---|
| 2014/0293503 A1* | 10/2014 | Sasabayashi | ........ | H10N 30/872 |
| | | | | 361/301.4 |
| 2015/0318110 A1* | 11/2015 | Lee | .......................... | H01G 4/30 |
| | | | | 361/301.4 |
| 2015/0348712 A1* | 12/2015 | Lee | .......................... | H01G 4/30 |
| | | | | 156/89.12 |
| 2024/0222029 A1 | 7/2024 | Lee et al. | | |

FOREIGN PATENT DOCUMENTS

| | | |
|---|---|---|
| CN | 216119932 U | 3/2022 |
| JP | 2006-237078 A | 9/2006 |

(Continued)

*Primary Examiner* — Nathan Milakovich
(74) *Attorney, Agent, or Firm* — Volpe Koenig

(57)     ABSTRACT

An electronic component includes a functional part includ-
ing a first surface facing a first side in a first direction, and
a cover overlapped with the first surface. The cover includes
at least two insulator layers, at least one dummy electrode,
and a base electrode. The at least two insulator layers and the
at least one dummy electrode are overlapped alternately in
the first direction. The base electrode is overlapped with an
outermost one of the insulator layers from the first side. The
cover includes a first range overlapped with the base elec-
trode or the dummy electrode in a plan perspective view in
the first direction. In the first range, an innermost one of the
insulator layers is smaller in void density than the outermost
one of the insulator layers, and/or the innermost one of the
insulator layers is smaller in void ratio than the outermost
one of the insulator layers.

20 Claims, 6 Drawing Sheets

(56) References Cited

FOREIGN PATENT DOCUMENTS

| JP | 2006278557 | A | * | 10/2006 | | |
| JP | 2008-041786 | A | | 2/2008 | | |
| JP | 2014-212298 | A | | 11/2014 | | |
| JP | 2015-226053 | A | | 12/2015 | | |
| JP | 2024-095953 | A | | 7/2024 | | |
| WO | 2024/161743 | A1 | | 8/2024 | | |
| WO | WO-2024210103 | A1 | * | 10/2024 | .............. | H01G 4/30 |

* cited by examiner

ELECTRONIC COMPONENT

REFERENCE TO RELATED APPLICATIONS

This application is a Bypass Continuation-In-Part Application which claims priority under 35 U.S.C. § 119 of International Application No. PCT/JP2024/043653, filed on Dec. 10, 2024, in the WIPO, the entire contents of which are hereby incorporated by reference.

BACKGROUND OF THE INVENTION

1. Field of the Invention

The present disclosure relates to an electronic component such as a stacked ceramic capacitor.

2. Description of the Related Art

A known stacked ceramic capacitor includes ceramic layers and inner electrodes stacked alternately (e.g., Japanese Unexamined Patent Application Publication No. 2014-212298). According to Japanese Unexamined Patent Application Publication No. 2014-212298, a stacked body constituted by the ceramic layers and the inner electrodes includes an upper surface and a lower surface each overlapped with a stacked body including ceramic layers and auxiliary electrodes stacked alternately.

SUMMARY OF THE INVENTION

According to an aspect of the present disclosure, an electronic component includes a functional part and a covering part. The functional part includes a first surface facing a first side in a first direction. The covering part is overlapped with the first surface. The covering part includes at least two insulator layers, at least one dummy electrode, and a base electrode. The at least two insulator layers and the at least one dummy electrode are overlapped alternately in the first direction. The base electrode is overlapped with an outermost one of the insulator layers from the first side. It is to be assumed that the covering part includes a first range referring to a range overlapped with the base electrode or the dummy electrode in a plan perspective view in the first direction.

In an example, when void density refers to a total number of voids per unit area of an insulator layer in a section in the first direction, an innermost one of the insulator layers is smaller in void density than the outermost one of the insulator layers in the first range.

In an example, when a void occupation area ratio refers to total areas of voids per unit area of an insulator layer in a section in the first direction, the innermost one of the insulator layers is smaller in void occupation area ratio than the outermost one of the insulator layers in the first range.

DESCRIPTION OF THE PREFERRED EMBODIMENTS

Figure 1:
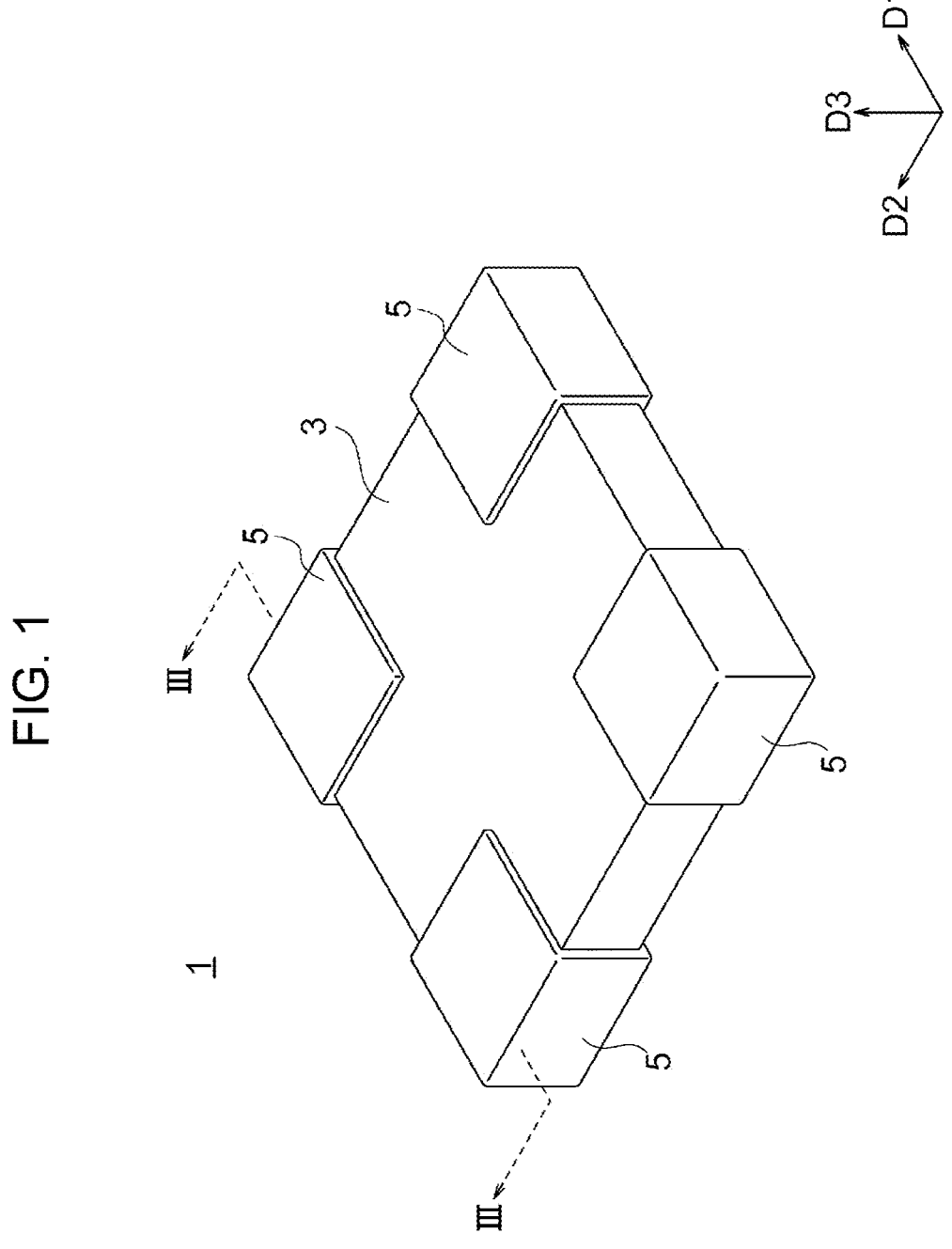
FIG. 1 is a perspective view of a capacitor according to a first embodiment.

Embodiments of the present disclosure will be described hereinafter with reference to the drawings. The following description will refer to schematic drawings. Accordingly, scale ratios and the like on the drawings do not necessarily match actual scale ratios and the like. Furthermore, the scale ratios and the like may differ among the drawings. Any of the specific shapes, sizes, and the like may be emphasized or undetailed. However, the above statement does not contradict that actual shapes or sizes are defined as illustrated or that any characteristic of any size or shape may be extracted from any drawing.

An aspect to be described relatively later will basically refer only to differences from an aspect described relatively earlier. Unless otherwise specified, any matter may be defined as the same as or similar to any aspect described earlier or may be analogized from any aspect described earlier. Any constituent elements corresponding to each other in different aspects may occasionally be denoted by an identical reference sign for convenience even if the corresponding constituent elements have any difference therebetween.

Descriptions of embodiments may refer to any term expressing shape, which includes or does not include size. Such a term may be comprehended in either manner unless otherwise causing inconsistency or the like. A rectangle (or rectangular shape) or a rectangular parallelepiped (or rectangular parallelepiped shape) may include chamfered corners. Such a shape may include a relatively small concave or convex portion (not formed in error but provided intentionally). The same or a similar applies to any different shapes. When a predetermined layer has a constant thickness, the thickness may be varied due to any manufacturing error (if the constant thickness is intended).

Determination may be conducted rationally of whether or not various sizes are included in a range (an absolute value in μm or the like or a relative value to a different size) exemplified in the description of embodiments. Sizes of exceptional portions or the like may be made out of consideration. More specifically, a chamfered portion may be ignored in the determination of whether or not a thickness is within a predetermined range. In an exemplary layer intended to have a constant thickness, a thickness of an end may be made out of consideration when the thickness of the end is dramatically different from (e.g., dramatically thinner than) the thicknesses of most of the remaining portions (e.g., 60% or more or 80% or more of an area). When the predetermined layer intended to have a constant thickness mostly has thickness variability, reference may be made to an average value or the like. If both the minimum and maximum thickness values are within a numerical range, no average value obviously needs to be specified or referred to purposely.

In a material (e.g., a conductive material or an insulating material), a principal component may exemplarily occupy 60 mass % or more or 80 mass % or more.

Summary of Embodiments

FIG. 1 is a perspective view of a capacitor 1 (an exemplary electronic component) according to a first embodiment. FIG. 1 and the other drawings to be referred to later are each provided with an orthogonal coordinate system D1D2D3 for convenience. The capacitor 1 may be disposed to have any surface directed upward or downward. However, expressions such as upper and lower surfaces may be used, assuming a +D3 side as an upper side for convenience in the description of embodiments.

Examples of the capacitor 1 include a stacked ceramic capacitor. The capacitor 1 includes a body 3 having a substantially rectangular parallelepiped shape, and four outer electrodes 5 positioned at four corners of the body 3 in a planar view (in a D3 direction). The outer electrodes 5 contribute to the electrical connection between the capacitor 1 and a different electronic component (e.g., circuit board (not illustrated)).

Figure 3:
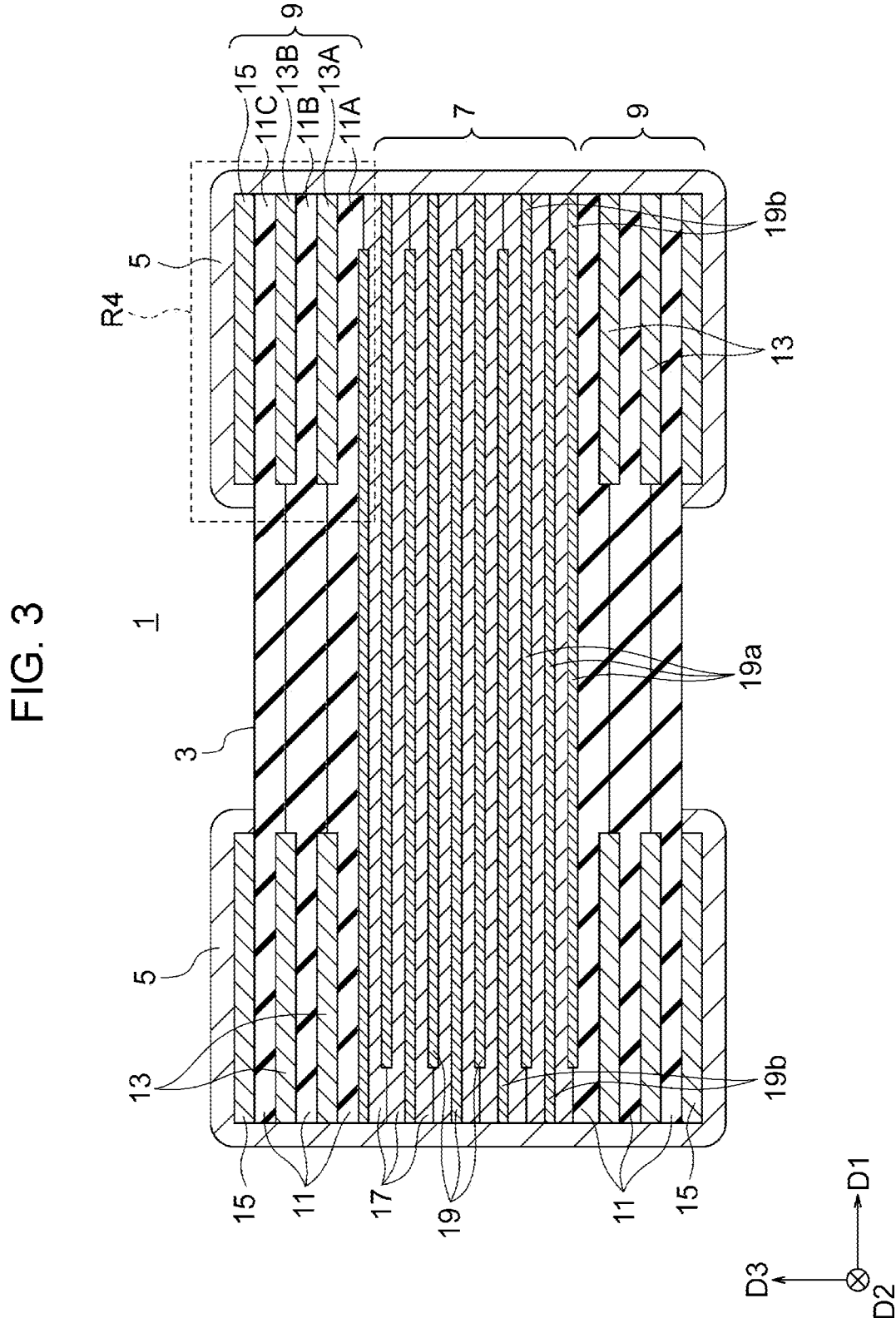
FIG. 3 is a sectional view taken along line III-III indicated in FIG. 1.

FIG. 3 is a sectional view taken along line III-III in FIG. 1. FIG. 3 illustrates a D1D3 section cutting the outer electrodes 5 on a +D2 side. Note that the D1D3 section cutting the outer electrodes 5 on a –D2 side, a D2D3 section cutting the outer electrodes 5 on a –D1 side, and a D2D3 section cutting the outer electrodes 5 on a +D1 side are also basically the same as or similar to the D1D3 section cutting the outer electrodes 5 on the +D2 side. Embodiments may describe positional relationships and the like between constituent elements with use of expressions D1, D2, and D3, assuming the section exemplarily illustrated in FIG. 3 without specification for convenience.

The body 3 exemplarily includes a functional part 7 and two covers 9 (exemplifying covering parts), respectively overlapped with the upper and lower surfaces of the functional part 7. The functional part 7 corresponds to a portion (or at least part thereof) directly functioning as an electronic component (capacitor herein). The covers 9 contribute to an increase of at least one of the protection of the functional part 7 or the strength of the capacitor 1.

A region R4 will be focused on in FIG. 3. Each of the covers 9 includes two or more (three exemplarily illustrated) insulator layers 11 (11A to 11C) alternately stacked in the D3 direction, and one or more (the number of the insulator layers 11-1 from a different viewpoint) dummy electrodes 13 (13A and 13B). The cover 9 further includes a base electrode 15 overlapped with an upper surface of the outermost insulator layer 11C.

The outermost layer indicates herein the farthest one of the insulator layers 11 of each of the covers 9 from the functional part 7 in a stacking direction. The innermost layer to be referred to later indicates herein the closest one of the insulator layers 11 of each of the covers 9 to the functional part 7 in the stacking direction.

Though the region R4 on the +D1 side and the +D3 side is focused on herein, the same or a similar applies to any other region corresponding to the region R4. Descriptions of embodiments may exemplify the region R4, use expressions of upper and lower surfaces, or refer to positive and negative sides of each of axes (D1, D2, and D3), without specification for convenience.

The insulator layers 11 contribute to insulation and the like of the functional part 7. The dummy electrodes 13 and the base electrode 15 contribute to at least one of the deposition of metal forming the outer electrodes 5 in accordance with a plating method, enhancement of force firmly fixing the outer electrodes 5 to the body 3, or the like. FIG. 3 illustrates, for convenience, a boundary line between the insulator layers 11 where the insulator layers 11 are directly overlapped (and the dummy electrodes 13 are not disposed).

Such a boundary line may actually be unable to be observed (the same or a similar applies to dielectric layers 17 to be described later).

Figure 4:
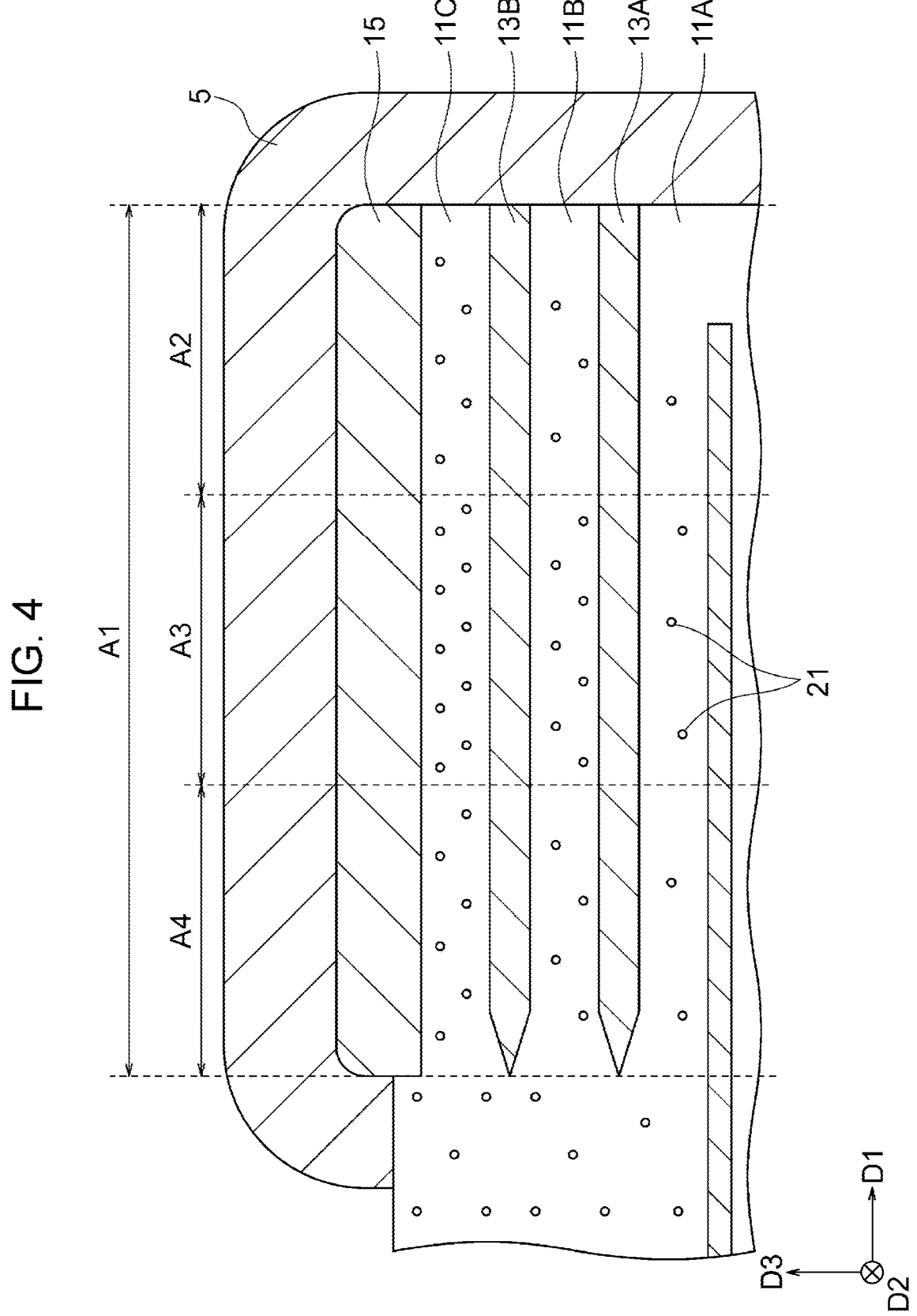
FIG. 4 is an enlarged view of a region R4 indicated in FIG. 3.

FIG. 4 is an enlarged view of the region R4. The insulator layers 11 are not hatched for convenience. FIGS. 3 and 4 are differently illustrated in configuration details. Reason for such a difference may be comprehended as schematic illustration in FIG. 3 rather than in FIG. 4, or exemplary illustration of a precisely different aspect in FIG. 4 from FIG. 3. FIG. 4 does not include the boundary line illustrated for convenience in FIG. 3, where the insulator layers 11 (and the dielectric layers 17) are directly overlapped.

The insulator layers 11 each include a plurality of voids 21. A term "void density" will refer to the number of voids 21 per unit area in a section (in the D3 direction) illustrated in the figure. A term "void occupation area ratio" will refer to total areas of the voids 21 per unit area in the section. The covers 9 each expand to include a range referred to as a first range A1 and overlapped with the base electrode 15 or the dummy electrode. In the first range A1, the innermost insulator layer 11A is smaller in at least one of void density or void occupation area ratio than the outermost insulator layer 11C.

The insulator layer 11A or the like relatively close to the functional part 7 is thus reduced in probability of any cracks due to the voids 21. Such reduced cracks adjacent to the functional part 7 stabilizes characteristics of the functional part 7. Meanwhile, the outermost insulator layer 11C is provided in the upper surface with relatively many concave portions that are formed on the basis of a principle identical or similar to a principle for formation of the voids 21. This improves intimate contact strength of the base electrode 15 due to an anchor effect to reduce peeling. This facilitates balancing between characteristic reliability and structural strength reliability.

The above effects are not necessarily achieved. Any technical idea different from the above viewpoint may be extracted from the present disclosure. In this case, the above magnitude relationship is not necessarily established in at least one of the void density or the void occupation area ratio, and the first range A1 does not necessarily include at least two insulator layers 11 and at least one dummy electrode 13.

The embodiments have been summarized above. Specifically, the embodiments will be described substantially in the following order.

1. First embodiment (FIGS. 1 to 4)
   1.1. Entire configuration
   1.2. Functional part
   1.3. Cover (excluding void)
      1.3.1. Entire cover
      1.3.2. Insulator layer
      1.3.3. Dummy electrode and base electrode
   1.4. Outer electrode
2. Void
   2.1. General voids
   2.2. Void density and void occupation area ratio
   2.3. Others
3. Capacitor manufacturing method
4. Other embodiments
   4.1. Second embodiment (FIG. 5)
   4.2. Third embodiment (FIG. 6)
   4.3. Embodiments not illustrated
5. Conclusions of embodiments

1. First Embodiment

1.1. Entire Configuration

FIG. 1 illustrates the capacitor 1 exemplarily configured as a chip-type component to be surface mounted. Specifically, the capacitor 1 is exemplarily disposed such that a surface on a −D3 side or the +D3 side faces a circuit board (not illustrated). The capacitor 1 is mounted to the circuit board when the four outer electrodes 5 and four pads of the circuit board are respectively bonded by a conductive bonding material (e.g., solder, not illustrated).

The capacitor 1 is configured (in terms of internal structure and outer shape) to be plane symmetric with respect to an exemplary symmetry plane (not illustrated), substantially in parallel with a D1D2 plane and passing through a center in a thickness direction (D3 direction) of the capacitor 1. The capacitor 1 is configured to be rotation symmetric by 180 degrees in the D3 direction or the like. Obviously, the capacitor 1 does not necessarily have such symmetry.

The body 3 exemplarily has a substantially thin rectangular parallelepiped shape. The rectangular parallelepiped may have a square shape (as exemplarily illustrated) or an oblong shape (except for the square shape, the same or a similar applies hereinafter) in a planar view. Descriptions of embodiments may assume the square shape unless otherwise specified for convenience.

Though not specifically illustrated, the body 3 may include chamfered corners. Such chamfering may be relatively significant. For example, a chamfered surface in a curved surface shape or a planar shape may expand entirely on a side surface of the cover 9 and partially on a side adjacent to the cover 9 of the functional part 7. Such a chamfered surface may be obtained exemplarily by barrel polishing the body 3.

The body 3 (or the capacitor 1) has a specific size that may be determined appropriately. Exemplified below is the size of the capacitor 1 formed relatively small. The body 3 (or the capacitor 1) may have lengths from 0.3 mm to 2.0 mm in a D1 direction and a D2 direction. The body 3 (or the capacitor 1) may have a thickness from 0.030 mm to 1.0 mm in the D3 direction. Exemplified later is also size of each constituent element for the capacitor 1 formed relatively small. The body 3 (or the capacitor 1) may thus be formed larger or smaller than the exemplified size.

A plurality of constituent elements of an identical type (e.g., elements 5, 9, 11, 13, 15, 17, and 19) may be basically (except relatively small differences or the like, the same or a similar applies hereinafter) provided identically (or correspondingly) in shape, size, material, position, and the like, unless otherwise specified or unless otherwise causing inconsistency or the like. Accordingly, unless otherwise specified or unless otherwise causing inconsistency or the like, description of a constituent element may be regarded as being common to a plurality of constituent elements of an identical type.

A single constituent element in a layer (film) shape (e.g., an element 5, 11, 13, 15, 17, or 19) may be entirely made of a single material. The single constituent element in the layer shape may alternatively include stacked layers made of different materials. A single constituent element in a layer shape entirely made of a single material may include a single layer or a plurality of stacked layers made of an identical material when a manufacturing process is focused on.

1.2. Functional Part

As illustrated in FIG. 3, the functional part 7 exemplarily has a substantially thin rectangular parallelepiped shape. The functional part 7 is basically identical in planar shape to the body 3. The functional part 7 has a specific thickness that may be determined appropriately. The thickness of the functional part 7 may exemplarily be 30% or more, 40% or more, or 50% or more, and 90% or less, 80% or less, 70% or less, or 60% or less of a thickness of the body 3. Any appropriate lower and upper limits mentioned above may be combined with each other. The thickness of the body 3 exemplarily corresponds to a distance from an upper surface of the base electrode 15 adjacent to an upper surface of the body 3 to a lower surface of the base electrode 15 adjacent to a lower surface of the body 3. The thickness of the functional part 7 exemplarily corresponds to a distance from an upper surface of an uppermost inner electrode 19 (to be described later) to a lower surface of a lowermost inner electrode 19.

The functional part 7 includes a plurality of dielectric layers 17 and the plurality of inner electrodes 19 stacked alternately. This configuration achieves a function as a capacitor.

Each of the dielectric layers 17 has a layer shape having a basically constant thickness (at least between the inner electrodes 19). The dielectric layers 17 are basically identical in shape and size to the functional part 7 in a planar view. The thickness of the dielectric layers 17 may be set appropriately in accordance with the required characteristics and the like of the capacitor 1. As an example of a relatively small thickness, the inner electrodes 19 adjacent to each other in the D3 direction have a distance that may be 0.1 μm or more or 0.5 μm or more and 3.0 μm or less, 2.0 μm or less, or 1.0 μm or less. Any appropriate lower and upper limits mentioned above may be combined with each other. The number of the dielectric layers 17 (inner electrodes 19) being stacked is determined appropriately. The number is exemplarily from 10 to 30. The dielectric layers are made of a ceramic or the like, and the ceramic is selected appropriately in terms of its specific type.

Each of the inner electrodes 19 has a layer shape having a constant thickness. The thickness of the inner electrodes 19 may be set appropriately, and may exemplarily be smaller than, substantially equal to, or larger than the thickness of the dielectric layer 17 in a region between the inner electrodes 19. As an example of a relatively small thickness, the thickness of the inner electrodes 19 may be 0.3 μm or more or 0.5 μm or more and 3.0 μm or less, 2.0 μm or less, or 1.0 μm or less. Any appropriate lower and upper limits mentioned above may be combined with each other. The inner electrodes 19 are made of a material (e.g., principal component) such as a metal. The metal may be specifically of an appropriate type, and the entirety or a principal component of the metal may be a base metal (e.g., at least one of Ni or Cu). The material for the inner electrodes 19 may contain a ceramic (co-material).

Figure 2:
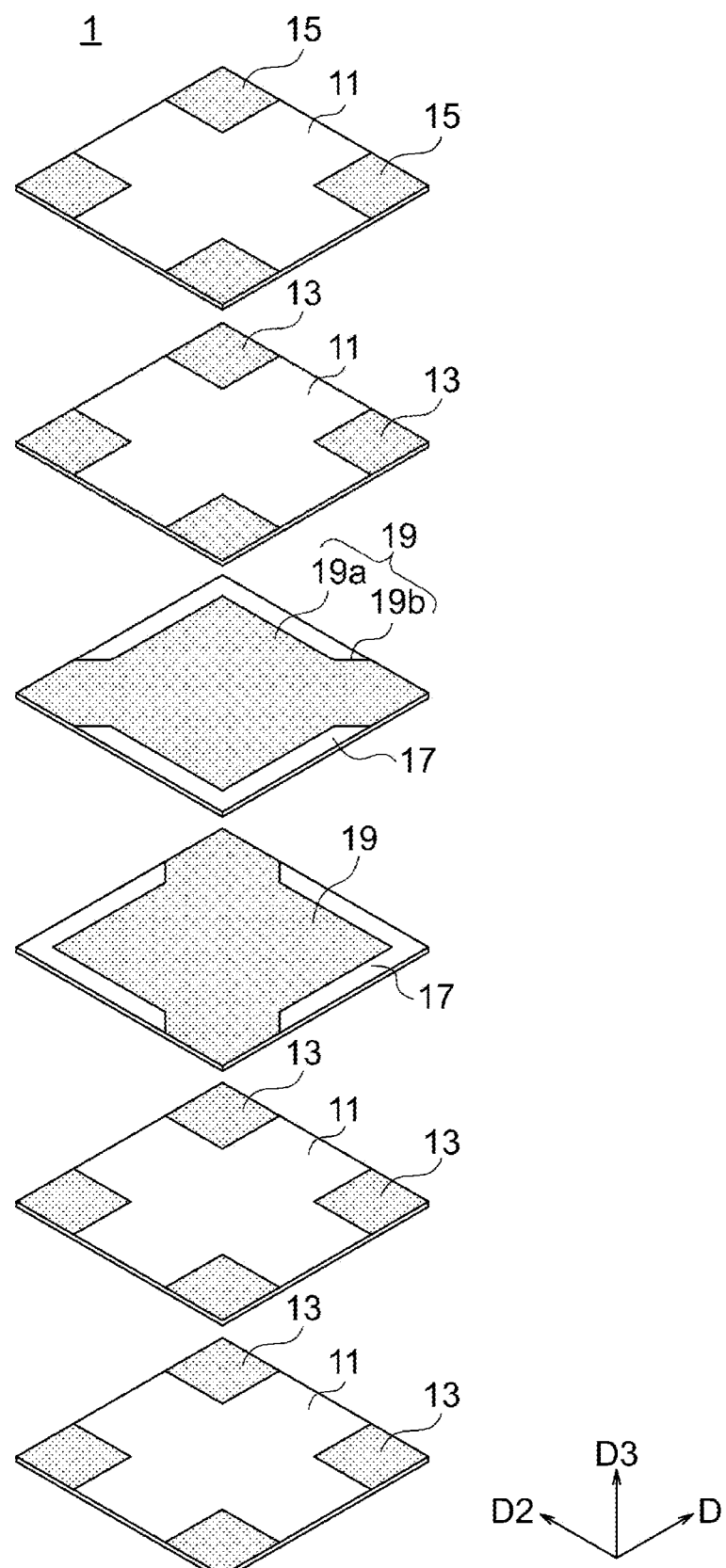
FIG. 2 is a schematic exploded perspective view of the capacitor in FIG. 1.

FIG. 2 is an exploded perspective view of the capacitor 1. FIG. 2 is a schematic view for comprehension of planar shapes and relative positions of the inner electrodes 19 and the like. FIG. 2 thus illustrates fewer various layers than FIG. 3.

Each of the inner electrodes 19 exemplarily includes, in a planar view, an electrode body 19a having a rectangular (square in exemplary illustration) shape, and a pair of extraction electrodes 19b extending from a pair of opposing corners of the electrode body 19a. The electrode body 19a is positioned inside an outer edge of the dielectric layer 17 so as not to be exposed from a side surface of the functional part 7. The pair of extraction electrodes 19b reaches the outer edge of the dielectric layer 17 and is connected to the pair of outer electrodes 5 positioned at a pair of opposing corners of the body 3. The inner electrodes 19 adjacent to each other in the D3 direction are each connected to a different pair of outer electrodes 5. Respective portions may be sized appropriately.

1.3. Cover (Excluding Void)

1.3.1. Entire Cover

As illustrated in FIG. 3, each of the covers 9 is exemplarily a layer substantially shaped and sized to be overlapped exactly with the functional part 7. The cover 9 has a substantially constant thickness in each of a region including the base electrode 15 (the first range A1) and a region including no base electrode. The thickness in the region including the base electrode 15 is exemplarily larger than the thickness in the region including no base electrode. This is because a conductive paste constituting the dummy electrode 13 and the base electrode 15 is disposed on a ceramic green sheet having a constant thickness. The entire cover 9 may alternatively have a roughly constant thickness by using a ceramic green sheet having an inconstant thickness, adopting a different manufacturing method, or the like.

The range of the thickness of the cover 9 exemplified below may be applied to any of the thickness in the region including the base electrode 15, the thickness in the region including no base electrode, and the entire thickness (average value) of the cover 9. The thickness in the region including the base electrode 15 can be regarded as a distance from an inner side surface (lower surface, the upper surface of the functional part 7) of the innermost insulator layer 11A to the upper surface of the base electrode 15 when the region R4 is focused on. When the base electrode 15 is mostly overlapped with the inner electrode 19 as in exemplary illustration, the thickness in the region overlapped with the inner electrode 19 may be referred to as the thickness in the region including the base electrode 15. In the same or a similar manner, the thickness in a region including the inner electrode 19 may be referred to as the thickness of the functional part 7.

A ratio in thickness of the cover 9 to the body 3 may substantially correspond inversely to the ratio (mentioned earlier) in thickness of the functional part 7 to the body 3. In an exemplary aspect with the covers 9 provided on the both sides in the D3 direction, the thickness of the single cover 9 may be 5% or more, 10% or more, 15% or more, or 20% or more, and 35% or less, 30% or less, or 25% or less of the thickness of the body 3. Any appropriate lower and upper limits mentioned above may be combined with each other.

The thickness of the single cover 9 may be 1/18 or more, 1/8 or more, 3/14 or more, 1/5 or more, or 1/3 or more, and 7/6 or less, 3/4 or less, 1/3 or less, or 1/2 or less of the thickness of the functional part 7. Any appropriate lower and upper limits mentioned above may be combined with each other.

The thickness of the single cover 9 may exemplarily be 5 μm or more, 10 μm or more, or 15 μm or more, and 50 μm or less, 30 μm or less, 25 μm or less, 20 μm or less, 15 μm or less, or 10 μm or less. Any appropriate lower and upper limits mentioned above may be combined with each other so as not to cause inconsistency.

1.3.2. Insulator Layer

The insulator layers 11 each have a layer shape having a substantially constant thickness except for variation in thickness due to whether or not the insulator layer 11 is overlapped with, for example, a conductor layer (13, 15, or 19). The insulator layers 11 are exemplarily basically identical in planar shape to the dielectric layers 17.

The number of the insulator layers 11 (the number of the dummy electrodes 13 in the first range A1 from a different viewpoint). In order to extract a technical idea that at least one of the void density or the void occupation area ratio satisfies the predetermined magnitude relationship in the outermost layer and the innermost layer as described in the summary of embodiments, the number of the insulator layers 11 is two or more (the number of the dummy electrodes 13 is one or more). FIGS. 3 and 4 exemplarily illustrate three insulator layers 11. Unlike such exemplary illustration, the number of the insulator layers 11 may be two, or four or more. In order to extract a technical idea different from the above (e.g., a magnitude relationship in at least one of the void density or the void occupation area ratio in a second range A2 to a fourth range A4 to be described later), the number of the insulator layers 11 may be one.

The thickness of the insulator layers 11 may be determined appropriately (e.g., thickness in the first range A1, the same or a similar applies to this paragraph and the next paragraph). The thickness of the insulator layers 11 may exemplarily be larger than (as exemplarily illustrated), substantially equal to, or smaller than the thickness of the dielectric layers 17 (between the inner electrodes 19) For example, the plurality of insulator layers 11 may be identical or different in thickness.

The thickness of the insulator layers 11 may exemplarily be twice or more, three times or more, or five times or more, and twenty times or less, ten times or less, or five times or less the thickness of the dielectric layers 17 (between the inner electrodes 19). Any appropriate lower and upper limits mentioned above may be combined with each other. The thickness of the insulator layers 11 may exemplarily be 1.0 μm or more or 2.0 μm or more and 10.0 μm or less or 5.0 μm or less. Any appropriate lower and upper limits mentioned above may be combined with each other.

The insulator layers 11 is made of any appropriate material. For example, the material for the insulator layers 11 may be identical to or different from a material for the dielectric layers 17. The plurality of insulator layers 11 may be made of an identical material or materials different from each other. The material for the insulator layers 11 may be a ceramic or a material other than the ceramic (e.g., a resin). Examples of the ceramic (as an entire material or a principal component) include barium titanate ($BaTiO_3$), titanium dioxide ($TiO_2$), strontium titanate ($SrTiO_3$), calcium titanate ($CaTiO_3$), and calcium zirconate ($CaZrO_3$)

1.3.3. Dummy Electrode and Base Electrode

The dummy electrodes 13 and the base electrode 15 may be configured identically except for positioning in the D3 direction. Description of this section accordingly refers to the dummy electrode 13 for convenience and may refer to no base electrode 15. Unless otherwise specified or unless otherwise causing inconsistency, terms for the dummy electrode 13 may be replaced with terms for the base electrode 15.

The dummy electrode 13 has an exemplary layer shape having a basically constant thickness. Each of the dummy electrodes 13 is exposed from a side surface and the like (two side surfaces in more detail) of the body 3. Such an exposed portion of each of the dummy electrodes 13 is firmly fixed to one of the outer electrodes 5. Each base electrode 15 constitutes a partial region in the upper surface or the lower surface of the body 3. Each of the base electrodes 15 is firmly fixed to one of the outer electrodes 5.

The dummy electrodes 13 are positioned, shaped, and sized appropriately in a planar view. As exemplarily illustrated in FIGS. 2 and 3, each of the dummy electrodes 13 is substantially positioned, shaped, and sized to be overlapped exactly with the outer electrode 5 (however, the outer electrode 5 is slightly larger) in a plan perspective view. The dummy electrodes 13 are positioned at four corners of the insulator layer 11 in a rectangular shape (square shape in exemplary illustration), and have a rectangular shape (square shape in exemplary illustration) including four sides respectively in parallel with four sides of the insulator layer 11.

Each of the dummy electrodes 13 has a length in the D1 direction (maximum length or the like if inconstant in the D2 direction, the same or a similar applies to the dummy electrodes 13 and the insulator layers 11 in this paragraph) which may exemplarily be $\frac{1}{10}$ or more or $\frac{2}{10}$ or more, and $\frac{4}{10}$ or less or $\frac{3}{10}$ or less of a length in the D1 direction of the insulator layer 11. Any appropriate lower and upper limits mentioned above may be combined with each other. The length of the dummy electrodes 13 in the D1 direction may exemplarily be 50 μm or more, 100 μm or more, or 150 μm or more, and 500 μm or less, 300 μm or less, or 200 μm or less. Any appropriate lower and upper limits mentioned above may be combined with each other. The length in the D1 direction is described exemplarily, while such a length may be applied to the length in the D2 direction.

Each of the dummy electrodes 13 has an area that may be $\frac{1}{100}$ or more or $\frac{4}{100}$ or more, and $\frac{16}{100}$ or less or $\frac{9}{100}$ or less of an area of the insulator layer 11. Any appropriate lower and upper limits mentioned above may be combined with each other. The dummy electrodes 13 have a total area that may be $\frac{4}{100}$ or more or $\frac{16}{100}$ or more, and $\frac{64}{100}$ or less or $\frac{36}{100}$ or less of the area of the insulator layer 11. Any appropriate lower and upper limits mentioned above may be combined with each other.

The thickness of the dummy electrodes 13 may be larger than (as exemplarily illustrated), substantially equal to, or smaller than the thickness of the inner electrode 19 or the like. For example, at least one dummy electrode 13 and at least one base electrode 15 may be identical or different in thickness. FIG. 3 exemplarily illustrates an aspect in which the plurality of dummy electrodes 13 and the plurality of base electrodes 15 are equal in thickness. FIG. 4 exemplarily illustrates another aspect in which the base electrodes 15 are thicker than the dummy electrodes 13. The thickness of the dummy electrodes 13 may be smaller than, substantially equal to, or larger than the thickness of the insulator layer 11 (e.g., thickness in the first range A1).

The thickness of the dummy electrodes 13 (except for the base electrodes 15) may exemplarily be one time or more, 1.5 times or more, or twice or more, and ten times or less, five times or less, or twice or less the thickness of the inner electrode 19. Any appropriate lower and upper limits mentioned above may be combined with each other so as not to cause inconsistency. The thickness of the dummy electrodes 13 (except for the base electrodes 15) may exemplarily be 0.3 μm or more, 0.5 μm or more, 1.0 μm or more, or 2.0 μm or more, and 10.0 μm or less, 5.0 μm or less, 3.0 μm or less, or 2.0 μm or less. Any appropriate lower and upper limits mentioned above may be combined with each other so as not to cause inconsistency.

The thickness of the base electrodes 15 may exemplarily be one time or more, twice or more, three times or more, or five times or more, and twenty times or less, ten times or less, or five times or less at least one of the thickness of the inner electrode 19 or the dummy electrode 13. Any appropriate lower and upper limits mentioned above may be combined with each other so as not to cause inconsistency. The thickness of the base electrodes 15 may exemplarily be 1.0 μm or more, 2.0 μm or more, 3.0 μm or more, or 5.0 μm or more, and 20.0 μm or less, 10.0 μm or less, or 5.0 μm or less. Any appropriate lower and upper limits mentioned above may be combined with each other so as not to cause inconsistency.

The dummy electrodes 13 are made of any appropriate material. For example, the material for the dummy electrodes 13 may be identical to or different from the material for the inner electrodes 19. Description of the material for the inner electrodes 19 may be applied to the material for the dummy electrodes 13 in either one of these cases.

As described earlier, the dummy electrodes 13 and the base electrodes 15 are different in positioning in the D3 direction. Specifically, each of the base electrodes 15 is positioned opposite to the functional part 7 with all the dummy electrodes 13 interposed therebetween in the region R4. From a different viewpoint, the base electrode 15 constitutes part of an upper surface of the cover 9, unlike the dummy electrodes 13. Furthermore, the upper surface of the base electrode 15 is basically uncovered with any insulator (the insulator layer 11 or any other insulator). Most (e.g., 60% or more, 80% or more, or 100%) of the upper surface of the base electrode 15 serves as a region connected to a different conductor (the outer electrode 5).

1.4. Outer Electrode

The outer electrodes 5 exemplarily have a layer shape having a basically constant thickness. As illustrated exemplarily in FIG. 1, the outer electrodes 5 substantially cover four surfaces (the upper surface, the lower surface, and two side surfaces) of the body 3 at corners of the body 3 in a planar view. This achieves connection between the single outer electrode 5 and the single extraction electrode 19b on the two side surfaces of the body 3, and also achieves surface mounting by any one of an upper surface and a lower surface of the capacitor 1. Each of the outer electrodes 5 has portions shaped and sized appropriately on respective surfaces. The outer electrode 5 includes a portion that is positioned on the upper surface or the lower surface of the body 3 and that exemplarily has a rectangular (square in exemplary illustration) planar shape. The outer electrode 5 further includes a portion that is positioned on the side surface of the body 3 and that exemplarily has a rectangular planar shape equal in transverse length to the portion positioned on the upper surface or the lower surface.

The thickness of the outer electrodes 5 is determined appropriately. The outer electrodes 5 may exemplarily be thicker than the inner electrodes 19, the dummy electrodes 13, and the base electrodes 15. The thickness of the outer electrodes 5 may exemplarily be 1.2 times or more, twice or more, or three times or more, and ten times or less, five times or less, or three times or less the thickness of the base electrodes 15. Any appropriate lower and upper limits mentioned above may be combined with each other. The thickness of outer electrodes 5 may exemplarily be 3 μm or more, 5 μm or more, or 10 μm or more, and 30 μm or less, 20 μm or less, or 10 μm or less. Any appropriate lower and upper limits mentioned above may be combined with each other so as not to cause inconsistency.

The outer electrodes 5 are exemplarily made of a material such as a metal. The metal may be specifically of an appropriate type, and the entirety or a principal component of the metal may be a base metal (e.g., at least one of Ni or Cu). The outer electrodes 5 may include stacked layers made of different materials as necessary. The outer electrodes 5 may exemplarily contain Cu, Ni, and Sn stacked in the mentioned order from the side adjacent to the base electrodes 15. The material for the outer electrodes 5 may be identical to or different from the material (e.g., a principal component) for at least one of the inner electrodes 19, the dummy electrodes 13, or the base electrodes 15.

2. Void

2.1. General Voids

The following description of the voids 21, the void density, and the void occupation area ratio are basically relevant to the first range A1. Even if the description does not clarify the voids 21, the void density, and the void occupation area ratio in the first range A1, the description may be regarded as referring to the first range A1 unless otherwise causing inconsistency or the like. Description of the first range A1 may be applied to the voids 21, the void density, and the void occupation area ratio in a range other than the first range A1 (in the region including no base electrode 15) or in the entire range including the first range A1, unless otherwise causing inconsistency or the like.

Following various configurations (e.g., an exemplary relative relationship in void density between the insulator layers 11) of the voids 21 in the first range A1 may be established in each (eight exemplified in FIGS. 1 to 3) of the first ranges A1. Alternatively, the various configurations may be established respectively in 60% or more or 80% or more of the total number of the first ranges A1, or may be established respectively in one or more appropriate first ranges A1. The voids 21 in the D1D3 section have the following configuration that may be established in the D2D3 section in addition to or in place of the D1D3 section.

FIG. 4 illustrates the voids 21 as spaces provided with no material. The voids 21 are generally sealed so as not to communicate with the outside of the capacitor 1. The voids 21 may contain gas. The gas may be of any appropriate type. The gas in the voids 21 may have appropriate pressure that is exemplarily lower than the atmospheric pressure at normal temperature.

When the insulator layers 11 are exemplarily made of a ceramic, the voids 21 are formed because gaps between particles do not disappear completely during burning. When the insulator layers 11 are made of a different insulating material (e.g., a resin), the voids 21 are formed by gas contained during flowing, contraction of the insulating material during cooling, or the like. Descriptions of embodiments may exemplify the aspect in which the insulator layers 11 are made of a ceramic without specification.

The voids 21 are not particularly limited in shape. In an exemplary section illustrated in FIG. 4, each of the voids 21 may have an aggregated shape such as a circular shape or an elliptical shape, or may have a linear shape or a cracked shape. In the exemplary section illustrated in FIG. 4, assume that each of the voids 21 has an aspect ratio as the maximum value obtained by dividing a larger one of lengths in two appropriate directions perpendicular to each other by a smaller one of the lengths. In each of the insulator layers 11 including at least one void 21 (in the entirety or a portion positioned in the first range A1), the number of the voids 21 having 3.0 or less as the aspect ratio may be 80% or more, 90% or more, 95% or more, or 100% of the total number of the voids 21.

The voids 21 are not particularly limited in size. The length in the D3 direction of each of the voids 21 is exemplarily smaller than the thickness (an average thickness of the entirety, an average thickness in the first range A1, or a thickness at the position of the void 21) of the insulator layer 11, including the void 21. The former is exemplarily ⅔ or less, ½ or less, or ⅓ or less of the latter. In each of the insulator layers 11 including at least one void 21 (in the entirety or the portion positioned in the first range A1), the number of the voids 21 having the length in the D3 direction less than the thickness (or any one of the lengths mentioned above) of the insulator layer 11 may be 95% or more or 100% of the total number of the voids 21.

The insulator layers 11 are basically formed to include fewer voids 21. In this case, each of the voids 21 is likely to have an aggregated shape, and the plurality of voids 21 tends to be similar in shape and size. FIG. 4 includes a schematic illustration of the voids 21 in such a case.

2.2. Void Density and Void Occupation Area Ratio

When the plurality of voids 21 is similar in shape and size as mentioned above, the void density and the void occupation area ratio correlate with each other. Description of void density may thus be applied to a void occupation area ratio by replacing the void density with the void occupation area ratio unless otherwise causing inconsistency or the like. Descriptions of embodiments may refer only to void density without referring to a void occupation area ratio for convenience.

The following description may regard a reference sign of each portion as void density (or void occupation area ratio) of the portion for convenience. As described in the summary of embodiments, when the void density of the insulator layer 11A is less than the void density of the insulator layer 11C in the first range A1, such a state may exemplarily be expressed as 11A <11C. Furthermore, a ratio of the former to the latter may exemplarily be expressed as 11A/11C.

Void density is a parameter in a predetermined section (the D1D3 section in FIG. 4). FIG. 4 indicates an extent of the first range A1 (a range overlapped in the D3 direction with a range overlapped with the base electrode 15 or the dummy electrode) in a direction of the predetermined section (the D1 direction), while the first range A1 also has an extent in a direction perpendicular to the predetermined section (the D2 direction in FIG. 4). When a predetermined condition (e.g., 11A <11C) relevant to void density is established in the first range A1, the predetermined condition is established in a predetermined rate or more of a predetermined number of sections obtained by equally dividing the first range A1 in the D2 direction. The predetermined number may exemplarily be three or more, five or more, ten or more, or twenty or more. The predetermined rate may exemplarily be 60% or more, 80% or more, or 90% or more. The first range A1 is exemplified above, while the same or a similar applies to other ranges and the like to be described later. If the predetermined number of sections in a single sample are difficult to be observed, the predetermined number of sections may be observed in a plurality of samples intended to be configured identically. If the predetermined number of sections in the first range A1 are difficult to be observed, sections may be observed in a range other than the first range A1 intended to be configured identically.

Void density and a void occupation area ratio have been described earlier in terms of definition. Repeatedly describing for caution's sake, void density is obtained by dividing the number of voids 21 in a specified target region by a sectional area of the target region in each section. For example, void density of the insulator layer 11A has a value obtained by dividing the number of voids 21 in the insulator layer 11A by a sectional area of the insulator layer 11A. Void density of at least two insulator layers 11 (the entirety thereof) has a value obtained by dividing the number of voids 21 in the at least two insulator layers 11 by sectional areas (the sum of the sectional areas of the at least two insulator layers 11) of the at least two insulator layers 11. As comprehended from this exemplification, the void density of the at least two insulator layers 11 does not have a value obtained by dividing the simple sum of void density values of the insulator layers 11 by the number of the insulator layers 11. In the same or a similar manner, a void occupation area ratio is obtained by dividing total areas of voids 21 in a target region by a sectional area of the target region.

The voids 21 referred to for specification of void density and a void occupation area ratio may exemplarily be determined to have 0.008 $\mu m^2$ or more. This size exemplarily corresponds to the size of the void 21 that can be visually recognized in an image magnified by 1500 times obtained by capturing such a section as illustrated in FIG. 4 with use of a scanning electron microscope (SEM). Assuming the voids 21 having at least the above area as targets facilitates counting the voids 21 and calculating the areas of the voids 21 along with image processing by devices including the SEM. If the void 21 exemplarily has a linear shape thin enough to have difficulty in specifying the area (e.g., a width of at most resolving power), the void 21 may be excluded from calculation of void density and a void occupation area ratio.

Void density and a void occupation area ratio may be specified exemplarily with use of JSM-IT500HR manufactured by JEOL Ltd. An image may be captured under conditions with a magnification of 1500 times, an accelerating voltage of 15 kV, and an illumination current of 70 (without unit). The number of the voids 21 in the target region may be specified by visual observation in accordance with the image. Alternatively, a range for area measurement (the target region or the voids 21) may be specified in accordance with visual observation of the image, and the area of the range may be obtained through image processing.

Void density and a void occupation area ratio may be specified by basically targeting the voids 21 closed in an observed section. The upper surfaces or the lower surfaces of the insulator layers 11 are not necessarily smooth, and concave portions in the upper surfaces or the lower surfaces may be difficult to be distinguished from the voids 21. However, a cavity apparently regarded as the void 21 in terms of its shape, size, or the like may be taken into specification of void density and a void occupation area ratio. Examples of such a cavity include a roughly closed cavity and a cavity obviously larger than a concave portion.

As described in the summary of embodiments, 11A <11C is established as the void density in the first range A1. When at least three insulator layers 11 are provided, the insulator layer 11 (the single insulator layer 11B in exemplary illustration) positioned between the insulator layer 11A and the insulator layer 11C has appropriate void density. When the void density in the insulator layer 11B (if at least two insulator layers 11B are provided, void density of the entirety or each of the layers, the same or a similar applies hereinafter unless otherwise causing inconsistency or the like) may be less than, equal to, or more than the void density of the insulator layer 11A (or the insulator layer 11C).

As illustrated exemplarily in FIG. 4, the void density increases as the insulator layer 11 is disposed on an outer side in the first range A1. That is, 11A <11B <11C is established. When 11A <11B <11C is established as in exemplary illustration and at least two insulator layers 11B are provided unlike the exemplary illustration, the insulator layers 11B may have any appropriate magnitude relationship in void density. For example, the insulator layer 11B disposed on an outer side may have larger void density, or the insulator layers 11B may be substantially equal in void density.

The covers 9 (the entirety of the plurality of insulator layers 11 from a different viewpoint) each have void density that may be varied in the D1 direction (and/or the D2 direction, the same or a similar applies hereinafter) in place of or in addition to the D3 direction. The D1 direction can be regarded as a direction facing a side surface (a side surface on the +D1 side in FIG. 4) of the cover 9. The D1 direction can also be regarded as a direction in which the base electrodes 15 expand (moreover, a direction exposed from the side surface on the +D1 side). The variation in the void density in the D1 direction may have a decrease or an increase in value toward the −D1 side (inward).

As illustrated in FIG. 4, the variation in the void density in the D1 direction may be found as a magnitude relationship in the void density among the second range A2 to the fourth range A4 defined by equally dividing the first range A1 into three portions in the D1 direction. The second range A2 can be regarded as a range adjacent to the side surface on the +D1 side (the side surface from which the base electrodes 15 are exposed) among the three ranges. The third range A3 can be regarded as a center range among the three ranges. The fourth range A4 can be regarded as a range far from the side surface on the +D1 side among the three ranges, and can also be regarded as a range adjacent to the center of the cover 9 in exemplary illustration.

As illustrated exemplarily in FIG. 4, the plurality of insulator layers 11 (11A to 11C) has void density satisfying A4<A3 and A2<A3. In this case, the void density in the second range A2 may be less than, equal to, or more than the void density in the fourth range A4. Alternatively, only one of A4<A3 and A2<A3 may be established, unlike the above description. Still alternatively, A4 (and/or A2)=A3 or A4 (and/or A2)>A3 may be established.

Described above is the variation in the D1 direction of the void density in the first range A1 and the entirety of the plurality of insulator layers 11. Alternatively, in place of or in addition to the entirety of the plurality of insulator layers 11, the above variation may be established in each of the plurality (all) of insulator layers 11, or may be established only in each of one or more appropriate insulator layers 11.

The magnitude relationship of void density between the first range A1 and a region outside the first range A1 (from another perspective, a region between adjacent first ranges A1) may be arbitrary. For example, the void density in the first range A1 may be smaller than, equal to, or greater than the void density in the region outside the first range A1. Further, as with the variation of void density in the D1 direction within the first range A1, the above magnitude relationship may hold throughout all of the plurality of insulator layers 11, or in each of the plurality (all) of the insulator layers 11, or only in each of one or more arbitrary insulator layers 11. In one example, in the insulator layer 11A, the void density in the first range A1 may be smaller than the void density in the region outside the first range A1. Furthermore, the void density in the first range A1 of the insulator layer 11A may be smaller than the void density in the region outside the first range A1 of each of the other insulator layers 11 (11B and 11C).

Each of the magnitude relationships exemplarily described above has an appropriate difference degree (difference, ratio, or the like). For example, when the void density in the first range A1 satisfies 11A <11C, a value 11A/11C may be 9/10 or less, 4/5 or less, 3/4 or less, 1/2 or less, or 1/3 or less. The value 11A/11C has a lower limit that is not particularly restricted (can be zero). A value 11C-11A may exemplarily be 0.005 pieces/$\mu m^2$ or more, 0.010 pieces/$\mu m^2$ or more, 0.020 pieces/$\mu m^2$ or more, 0.050 pieces/$\mu m^2$ or more, or 0.100 pieces/$\mu m^2$ or more. The value 11C-11A has an upper limit that is not particularly restricted.

In an exemplary aspect in which the void density in the first range A1 satisfies 11A <11B <11C, a value 11B/11C may be $^{19}\!/\!_{20}$ or less, $^9\!/\!_{10}$ or less, $^7\!/\!_8$ or less, $^3\!/\!_4$ or less, or $^2\!/\!_3$ or less. The value 11B/11C has a lower limit (only when 11A <11B <11C is satisfied), which may be an appropriate value more than zero. A value 11A/11B may exemplarily be $^{18}\!/\!_{19}$ or less, $^8\!/\!_9$ or less, $^6\!/\!_7$ or less, $^2\!/\!_3$ or less, or $^1\!/\!_2$ or less. The value 11A/11B has a lower limit that is not particularly restricted (can be zero). At least one of a value 11C-11B or a value 11B-11A may exemplarily be 0.002 pieces/$\mu m^2$ or more, 0.005 pieces/$\mu m^2$ or more, 0.010 pieces/$\mu m^2$ or more, 0.025 pieces/$\mu m^2$ or more, or 0.050 pieces/$\mu m^2$ or more. The value 11C-11B and the value 11B-11A each have an upper limit that is not particularly restricted.

In an exemplary aspect in which the void density in the first range A1 and the entirety of the plurality of insulator layers 11 (or each of the insulator layers 11) satisfies A2<A3, a value A2/A3 may be $^9\!/\!_{10}$ or less, $^4\!/\!_5$ or less, $^3\!/\!_4$ or less, or $^1\!/\!_2$ or less. The value A2/A3 has a lower limit that is not particularly restricted (can be zero). A value A3-A2 may exemplarily be 0.005 pieces/$\mu m^2$ or more, 0.010 pieces/$\mu m^2$ or more, 0.020 pieces/$\mu m^2$ or more, 0.050 pieces/$\mu m^2$ or more, or 0.100 pieces/$\mu m^2$ or more. The value A3-A2 has an upper limit that is not particularly restricted. In the description of this paragraph and the next paragraph, A2 may be replaced with A4.

In an exemplary aspect in which the void density in the first range A1 is smaller than the void density outside the first range A1 in any of the insulator layers 11 (11A, 11B, or 11C), the ratio obtained by dividing the former by the latter of may be $^9\!/\!_{10}$ or less, $^4\!/\!_5$ or less, $^3\!/\!_4$ or less, or $^1\!/\!_2$ or less in each the insulator layer. The lower limit of the above ratio is not particularly limited (it may be zero).

The above exemplary description of the ratios (e.g., 11A/11C) in void density may be applied to ratios of void occupation area ratios. A difference in void occupation area ratio may be exemplified below. When 11A <11C is satisfied, a value 11C-11A (void occupation area ratio) may exemplarily be 0.005% or more, 0.010% or more, 0.020% or more, or 0.050% or more. When 11A <11B <11C is satisfied, at least one of a value 11C-11B or a value 11B-11A (void occupation area ratio) may be 0.002% or more, 0.005% or more, 0.010% or more, or 0.020% or more. A value A3-A2 (void occupation area ratio) may be 0.005% or more, 0.010% or more, 0.020% or more, or 0.050% or more. These values each have an upper limit that is not particularly restricted.

Void density has an appropriate absolute value when various conditions are established. The void density in the first range A1 and the innermost insulator layer 11A (and/or the insulator layer 11B) may exemplarily be 0.000 pieces/$\mu m^2$ or more, 0.005 pieces/$\mu m^2$ or more, 0.010 pieces/$\mu m^2$ or more, or 0.050 pieces/$\mu m^2$ or more, and 0.200 pieces/$\mu m^2$ or less, 0.100 pieces/$\mu m^2$ or less, or 0.050 pieces/$\mu m^2$ or less. Any appropriate lower and upper limits mentioned above may be combined with each other so as not to cause inconsistency.

The void density in the first range A1 and the outermost insulator layer 11C (and/or the insulator layer 11B) may exemplarily be 0.020 pieces/$\mu m^2$ or more, 0.050 pieces/$\mu m^2$ or more, or 0.100 pieces/$\mu m^2$ or more, and 0.500 pieces/$\mu m^2$ or less, 0.300 pieces/$\mu m^2$ or less, 0.200 pieces/$\mu m^2$ or less, or 0.100 pieces/$\mu m^2$ or less. Any appropriate lower and upper limits mentioned above may be combined with each other so as not to cause inconsistency.

The void occupation area ratio in the first range A1 and the insulator layer 11A (and/or the insulator layer 11B) may exemplarily be 0.005% or more, 0.010% or more, or 0.020% or more, and/or 0.100% or less, 0.080% or less, or 0.060% or less. Any appropriate lower and upper limits mentioned above may be combined with each other.

The void occupation area ratio in the first range A1 and the insulator layer 11C (and/or the insulator layer 11B) may exemplarily be 0.050% or more, 0.080% or more, or 0.100% or more, and/or 0.300% or less, 0.200% or less, or 0.150% or less. Any appropriate lower and upper limits mentioned above may be combined with each other.

At least one of the lower limit value or the upper limit value of at least one of the void density or the void occupation area ratio of the insulator layer 11A exemplified above may be applied to at least one of the second range A2 or the fourth range A4. At least one of the lower limit value or the upper limit value of at least one of the void density or the void occupation area ratio of the insulator layer 11C exemplified above may be applied to the third range A3.

2.3. Others

Though not illustrated in FIG. 4, a portion other than the insulator layers 11 may include voids. That is, at least one of the dielectric layers 17, the inner electrodes 19, the dummy electrodes 13, the base electrodes 15, or the outer electrodes 5 may include voids. In this case, voids in the dielectric layers 17 may be smaller (or may be larger) in an average value of diameters of circulars or similar shapes than the voids 21 in the insulator layers 11. Voids in the inner electrodes 19, the dummy electrodes 13, the base electrodes 15, and the outer electrodes 5 may be larger (or may be smaller) in an average value of diameters of circulars or similar shapes than the voids 21 in the insulator layers 11. The void density and the void occupation area ratio may also have appropriate values.

3. Capacitor Manufacturing Method

The capacitor 1 can be manufactured in accordance with any one of various methods. The method includes a schematic procedure that may be identical or similar to a known procedure. An exemplary procedure is described below.

Ceramic green sheets are initially produced to constitute the dielectric layers 17 and the insulator layers 11. A conductive paste is subsequently applied (e.g., printed) to the ceramic green sheets to constitute the inner electrodes 19, the dummy electrode 13, or the base electrodes 15. The ceramic green sheets are subsequently stacked to produce a stacked body constituting the body 3. Stacking of a stacked body constituting the functional part 7 and stacking of portions constituting the covers 9 to the stacked body may be executed together or separately.

The processes until production of the stacked body are executed in a size of a motherboard or the like to constitute a large number of bodies 3. After the stacked body is produced, the motherboard including the stacked body is divided (e.g., cut) into pieces roughly corresponding to the size of the body 3. The stacked body in the size of the body 3 is subsequently burned. The body 3 is then provided with a metal film to form the outer electrodes 5.

Grease may be removed prior to burning. Burning may be executed in a reducing atmosphere or the like. Burning may be followed by reoxidation heat treatment. At least before or after burning, the body 3 may be polished (e.g., barrel polishing). Polishing may include chamfering ridgelines of the body 3 or polishing the side surfaces of the body 3.

Void density may be adjusted in an appropriate manner. For example, the stacked body including no ceramic green sheet constituting the outermost insulator layer 11C is pressed in a step of stacking the ceramic green sheets to constitute the stacked body. The ceramic green sheet constituting the outermost insulator layer 11C is then overlapped with the stacked body to be pressed again. The insulator layer 11C is pressed in a smaller number of times than the remaining insulator layers 11, and is thus likely to include the voids 21.

Alternatively, the ceramic green sheet constituting the insulator layer 11C is exemplarily set smaller in the ratio of solid contents (e.g., ceramic powder) than the remaining ceramic green sheets. The insulator layer 11C is thus more likely to include voids 21 than the remaining insulator layers 11. The insulator layer may be constituted by a single or a plurality of green sheets.

The above refers to the method of increasing the void density of the insulator layer 11C (the method to satisfy 11A <11C). The above can obviously be practically applied to achieve 11A <11B <11C, A2 (and/or A4)<A3, and the like. In order to achieve A2<A3 as well as A4<A3, portions corresponding to the base electrodes 15 and the dummy electrodes 13 are pressed such that pressure is applied to ends rather than center portions of the electrodes. The void density may be differentiated in accordance with any other method. For example, the void density may be differentiated by appropriately setting temperature conditions for burning.

The outer electrodes 5 may be formed in accordance with any one of various methods. For example, at least one of electroplating or electroless plating may be adopted for metal deposition on surfaces of the base electrodes 15, exposed portions of the dummy electrodes 13 from the side surfaces of the body 3, and exposed portions of the inner electrodes 19 from the side surfaces of the body 3. That is, the outer electrodes 5 may include a plated film. Alternatively, a thin film forming method may be adopted, such as a dip method, a printing method, chemical vapor deposition (CVD), or physical vapor deposition (PVD). As comprehended from the above, the base electrodes 15, the dummy electrodes 13, and the inner electrodes 19 may or do not need to contribute to metal deposition.

4. Other Embodiments

4.1. Second Embodiment

Figure 5:
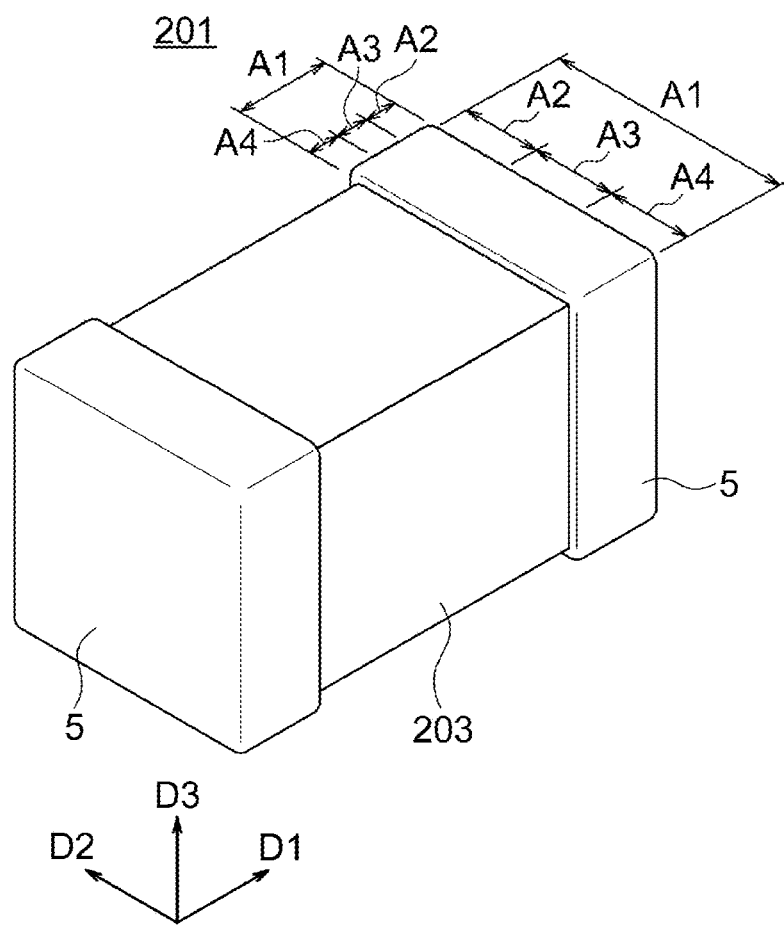
FIG. 5 is a perspective view of a capacitor according to a second embodiment.

FIG. 5 is a perspective view of a capacitor 201 according to the second embodiment. FIG. 3, according to the first embodiment, may be referred to as a figure illustrating a D1D3 section of the capacitor 201. The same or a similar applies to FIG. 4.

The capacitor 201 is generally different from the capacitor 1 in that the capacitor 201 is of a two-terminal type, whereas the capacitor 1 is of a four-terminal type. The capacitor 201 thus configured may be set to have the void density and the void occupation area ratio described with reference to FIGS. 3 and 4.

The capacitor 201 may include portions specifically shaped and sized differently from corresponding portions in the capacitor 1 due to a configuration of the two-terminal type. The capacitor 201 is specifically shaped and sized as follows.

A body 203 (or the capacitor 201) exemplarily has a substantially rectangular parallelepiped shape. The rectangular parallelepiped has a height (length in the D3 direction) which may be substantially equal to a width (length in the D2 direction) (as illustrated exemplarily) or may be smaller than the width. The rectangular parallelepiped has a length (in the D1 direction) that is exemplarily larger than the width. The body 203 may be sized appropriately. Specifically exemplified sizes of the body 3 according to the first embodiment may be applied to sizes of the body 203. The outer electrodes 5 each have a layer shape substantially covering longitudinal ends of the body 203 to reach five surfaces of the rectangular parallelepiped.

The inner electrodes 19 exemplarily have an oblong planar shape substantially including four sides in parallel with four sides of the oblong shape of the body 203 (the dielectric layers 17). The four sides of the inner electrodes 19 include two long sides and a single short side that are exemplarily positioned inside side surfaces of the body 203 (so as not to be exposed). The remaining one short side is exposed from a side surface on the +D1 side or the –D1 side of the body 203. Each of the inner electrodes 19 includes the electrode body 19a as a region overlapped with a different inner electrode 19 in a plan perspective view. A portion extending from the electrode body 19a to the outer electrode 5 corresponds to the extraction electrode 19b.

Two insulator layers 11 adjacent to each other in the D3 direction interpose two dummy electrodes 13 exemplarily provided at the longitudinal ends of the body 203. Each of the dummy electrodes 13 exemplarily has a rectangular planar shape extending entirely along the width (length in the D2 direction) of the body 203. The dummy electrode 13 is exposed from the side surface on the +D1 side or the –D1 side of the body 203, as well as is exposed from a side surface on the +D2 side and a side surface on a –D2 side. The above description of the configuration in a planar view of the dummy electrodes 13 may be applied to the planar shape of the base electrodes 15 overlapped with the uppermost insulator layer 11C.

In the first embodiment, the capacitor 1 includes the D1D3 section and the D2D3 section configured basically identically. In the description of the void density, the D1 direction and the D2 direction are basically reversible. In the second embodiment, the capacitor 201 includes a D1D3 section and a D1D2 section configured differently from each other.

In an aspect like the capacitor 201, the D1D3 section or the D2D3 section may be adopted as a section for measurement of void density in the first ranges A1. As a larger number of sections are measured, values in a plurality of D1D3 sections are theoretically approximate to values in a plurality of D2D3 sections. Either one of the sections may alternatively be selected from various viewpoints.

The second range A2 to the fourth range A4 are different in position and shape depending on whether the first range A1 is equally divided into three portions in the D1 direction or the D2 direction. Either the D1 direction or the D2 direction may be selected. When the D1 direction is selected, the fourth range A4 can be regarded as being positioned adjacent to the center of the capacitor 201 with respect to the second range A2 and the third range A3 identically or similarly to the first embodiment. When the D2 direction is selected, the fourth range A4 can be regarded as being positioned adjacent to a side surface of the capacitor 201 identically or similarly to the second range A2.

4.2. Third Embodiment

Figure 6:
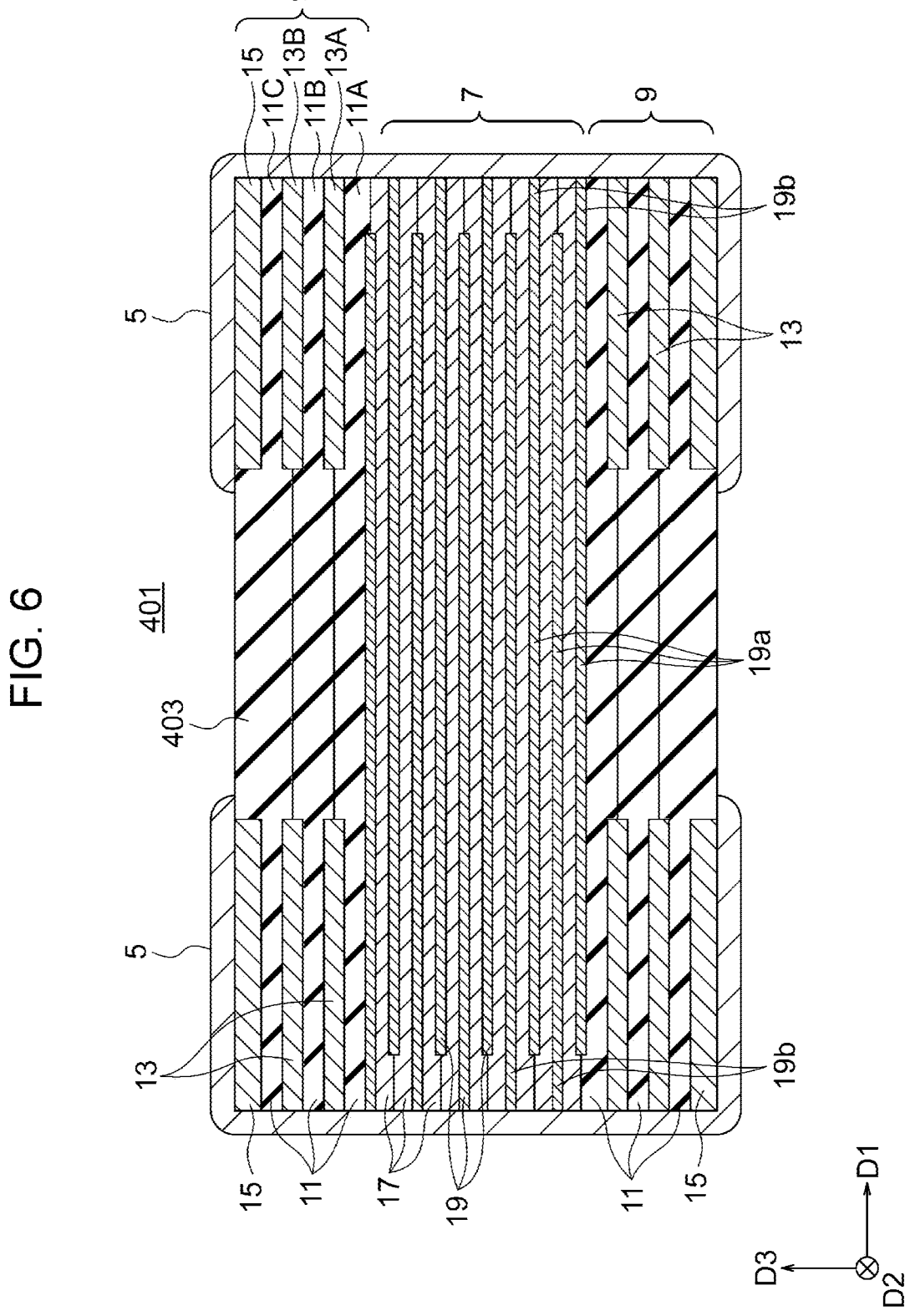
FIG. 6 is a sectional view of a capacitor according to a third embodiment.

FIG. 6 is a sectional view of a capacitor 401 according to the third embodiment. This sectional view corresponds to FIG. 3 in the first embodiment. The following description may exemplarily refer to an upper one of the covers 9 without specification for convenience. The capacitor 401 may be of the four terminal type as in the first embodiment, or may be of the two terminal type as in the second embodiment.

The capacitor 401 is briefly configured such that the base electrodes 15 are buried in the outermost insulator layer 11C in the capacitor 1 according to the first embodiment. As illustrated in FIG. 6, the upper surface of each of the base electrodes 15 is roughly flush with the upper surface of the outermost insulator layer 11. The upper surface of the base electrode 15 may alternatively be positioned above (or below) the upper surface of the outermost insulator layer 11.

Such disposition of the base electrodes 15 may be achieved with exemplary change as described below in the manufacturing method described earlier. Two layers of ceramic green sheets are prepared to constitute the single outermost insulator layer 11C. A conductive paste constituting the base electrodes 15 is disposed on a surface adjacent to an outer side (upper surface) of the inner ceramic green sheet (on a lower side). The outer ceramic green sheet (on an upper side) is provided with holes for the base electrodes 15.

Whether or not two or more layers of ceramic green sheets during the manufacturing process eventually constitute the single insulator layer 11 may be determined in accordance with whether or not the dummy electrodes 13 are interposed therebetween. For example, the insulator layer 11C may be regarded as a single insulator layer because no dummy electrode 13 is interposed between the two layers of ceramic green sheets that form the insulator layers 11C as described above.

In the above manufacturing method, the conductive paste constituting the base electrodes 15 is disposed on the upper surface of the inner ceramic green sheet. Eventually, the base electrodes 15 are unchangeably overlapped with the upper surface of the outer insulator layer 11C. Furthermore, the base electrodes 15 are unchangeably overlapped with the outermost insulator layer 11C from the +D3 side.

When the above manufacturing method is adopted, the outer ceramic green sheet may cover edges or the like of the base electrodes 15 due to any manufacturing error or intendedly. The two ceramic green sheets are not separated by the dummy electrodes 13 again in this case. The insulator layer 11C can thus be regarded as a single insulator layer. Furthermore, the base electrodes 15 (strictly portions uncovered with the outer ceramic green sheet) are unchangeably overlapped with the upper surface of the outermost insulator layer 11C, and the base electrodes 15 are unchangeably overlapped with the outermost insulator layer 11C from the +D3 side.

From a different viewpoint, as illustrated exemplarily in FIG. 6, the outermost insulator layer 11C is relatively significantly concave in the regions provided with the base electrodes 15. Also in this case, the base electrodes 15 are unchangeably overlapped with the upper surface of the outermost insulator layer 11C, and the base electrodes 15 are unchangeably overlapped with the outermost insulator layer 11 from the +D3 side.

The above description that the insulator layer 11C may be produced from the two or more ceramic green sheets and the above description that the insulator layer 11C may include relatively large concave portions may be applied to any other insulator layer 11. While the boundary line between the plurality of insulator layers 11 may be defined by the dummy electrodes 13 as described above, the plurality of insulator layers 11 may have a vague boundary in a range provided with no dummy electrode 13 in a plan perspective view.

FIG. 4 exemplarily illustrates an aspect in which the base electrode 15 is slightly buried in the insulator layer 11C. This exemplification assumes a state where the base electrode 15 (conductive paste) disposed on the upper surface of the outermost ceramic green sheet is pressed to enter the ceramic green sheet. In exemplification in both FIGS. 4 and 6, the base electrode 15 may be buried in the insulator layer 11 by an appropriate amount. Furthermore, regardless of the magnitude of the buried amount, the base electrode 15 may be buried in accordance with any appropriate method.

4.3. Embodiments not Illustrated

Other embodiments will be described, though not specifically illustrated.

The cover 9 may alternatively be provided only on the upper surface or the lower surface of the functional part 7. The capacitor 1 may be distributed from a plant to another plant in a state of being provided with no outer electrode 5 (i.e., the body 3).

The capacitor may include an exterior resin covering the entire structure, exemplarily illustrated in FIG. 1 or FIG. 5, and a lead wire connected to each of the outer electrodes 5 and extending from the exterior resin. From a different viewpoint, the capacitor is not of a surface mounting type and may be of a through-hole mounting type. In such an aspect, a single outer electrode 5 has only to cover a single side surface. The number of the terminals (outer electrodes 5) of the capacitor is not limited to two or four, and may be three, or five or more.

Two types of inner electrodes 19 connected respectively to different outer electrodes 5 may be alternately stacked two by two instead of one by one. In this case, the dielectric layer 17 interposed between the inner electrodes 19 facing each other and connected to an identical one of the outer electrodes 5 may be thinner than the dielectric layer 17 interposed between the inner electrodes 19 facing each other and connected respectively to different ones of the outer electrodes 5. As comprehended from above, the plurality of dielectric layers 17 do not need to be shaped and sized identically.

The two types of inner electrodes 19 connected respectively to the different outer electrodes 5 do not need to face each other. For example, the two types of inner electrodes 19 connected respectively to the different outer electrodes 5 may be provided in an identical layer, and the inner electrode 19 may be provided to face the two types of inner electrodes 19, so as to constitute a circuit including two parallel plate capacitors connected in series. Alternatively, constituted may be a circuit including three parallel plate capacitors connected in series.

As illustrated exemplarily in FIG. 5, the inner electrodes 19 in the rectangular shape are each interposed between the dielectric layers 17 expanding to both sides (outward) in the D2 direction beyond two parallel long sides in the D1 direction of the inner electrode 19, so that the two long sides are not exposed from the side surface on the −D2 side or the side surface on the +D2 side of the body 203. The configuration not to expose the long sides may alternatively be achieved by overlapping different dielectric layers on a side surface on the −D2 side and a side surface on the +D2 side of a stacked body including the dielectric layers 17 and the insulator layers 11. From a different viewpoint, the body 203 does not need to have an entirely stacked structure.

An electronic component is not limited to a capacitor. The electronic component may be of a stacked type other than a capacitor, or of an unstacked type. Examples of the electronic component of the stacked type include a stacked inductor, a stacked varistor, a stacked ferrite bead, a stacked thermistor, and a stacked filter. Examples of the electronic component of the unstacked type include an integrated circuit (IC) and many other electronic components.

The electronic component of the stacked type exemplarily includes a functional part (7) including nonconductors (e.g., the dielectric layers 17) and conductors (e.g., the inner electrodes 19) stacked alternately. Such a configuration enables formation of the cover 9, including at least two insulator layers 11 in an extension of an exemplary step of forming the functional part. This reduces the probability of complicated manufacturing steps even by adopting the configuration of the cover 9 according to any one of the embodiments.

A stacked ceramic filter may include an LC circuit or the like. As comprehended from this exemplification, the electronic component of the stacked type may have two or more functions (as a capacitor and an inductor). Portions achieving different functions may be portions different from each other in at least one of a plan perspective view or a side surface perspective view.

5. Conclusions of Embodiments

A configuration of an electronic component according to any one of the embodiments is extracted hereinafter to exemplify effects of the extracted configuration. The effects exemplified hereinafter are not necessarily achieved. The following description refers to the reference signs according to the first embodiment for convenience. Matters to be described hereinafter are applicable identically or similarly to any other embodiment unless otherwise causing inconsistency or the like. Repeatedly, unless otherwise causing inconsistency or the like, the term "void density" may be replaced with the term "void occupation area ratio" (or a term "void density and void occupation area ratio")

The capacitor 1 (exemplifying the electronic component) includes the functional part 7 and the cover 9 (exemplifying the covering part). The functional part 7 includes the upper surface (exemplifying the first surface) facing on the +D3 side (exemplifying the first side) in the D3 direction (exemplifying the first direction). The cover 9 is overlapped with the upper surface of the functional part 7. The cover 9 includes the at least two (three in exemplary illustration in FIG. 4) insulator layers 11 and at least one dummy electrode 13 (two in exemplary illustration in FIG. 4) overlapped alternately in the D3 direction, as well as the base electrode 15 overlapped with the surface (upper surface) on the +D3 side of the outermost insulator layer 11C.

The cover 9 expands to include the range referred to as the first range A1 and including the base electrode 15. Void density will refer to a total number of voids 21 per unit area in a section in the D3 direction. In this case, the innermost insulator layer 11A is smaller in void density than the outermost insulator layer 11C in the first range A1.

Additionally or alternatively, assuming that a void occupation area ratio refers to total areas of the voids 21 per unit area in the section in the D3 direction, the innermost insulator layer 11A is smaller in void occupation area ratio than the outermost insulator layer 11C in the first range A1.

As exemplarily described in the summary of embodiments, cracks can be reduced in the insulator layer 11A relatively close to the functional part 7, and peeling strength can be improved between the outermost insulator layer 11C and the base electrode 15. More specifically, reducing the void density in the insulator layer 11A exemplarily contributes to reducing the number of the voids 21 that may cause cracks. Reducing the void occupation area ratio in the insulator layer 11A exemplarily contributes to a reduction of stress concentrated around the voids 21. However, as described earlier, the void density and the void occupation area ratio actually correlate with each other in many cases.

The number of the insulator layers 11 may alternatively be three or more. In the first range A1, one or more insulator layers 11B (not each but entirely) positioned between the outermost insulator layer 11C and the innermost insulator layer 11A may be smaller in void density than the outermost insulator layer 11C, and may be larger in void density than the innermost insulator layer 11A (11A <11B <11C may be established in terms of void density).

This reduces the probability of rapid variation in void density exemplarily from the insulator layer 11A to the insulator layer 11C. This may exemplarily achieve approximation of mechanical characteristics between the insulator layers 11 adjacent to each other in the D3 direction and a reduction of stress generated therebetween.

The void density of the innermost insulator layer 11A may be ¾ or less of the void density of the outermost insulator layer 11C in the first range A1.

In this case, the insulator layers 11A and 11C exemplarily have a relatively large difference in void density to be likely to exhibit the above effects.

The cover 9 may include the side surface (e.g., the side surface on the +D1 side illustrated in FIG. 4) facing in the D1 direction (exemplifying the second direction) crossing the D3 direction. The base electrode 15 may expand in the D1 direction to reach the side surface on the +D1 side. The first range A1 is assumed to be equally divided into three portions in the D1 direction to define the second range A2 on the +D1 side, the third range A3 in the center, and the fourth range A4 on the −D1 side. In (all of) at least two insulator layers 11 (not each but entirely), the fourth range A4 and the second range A2 may each be smaller in void density than the third range A3.

In this case, the second range A2 and the fourth range A4 are exemplarily positioned at the ends of the base electrode 15 to be likely to allow entry of moisture. However, the ends include fewer voids 21 to reduce the entry of moisture for improvement in reliability. This configuration can also reduce the probability of cracks generated relatively close to the end on the −D1 side of the outer electrode 5 (closer to the fourth range A4 than the third range A3). A stacked ceramic capacitor often has cracks generated at an end on the −D1 side of an outer electrode. Reliability at such an end is improved for effective improvement in the reliability of the capacitor 1.

The cover 9 may be 25 μm or less in thickness in the first range A1.

In this case, the cover 9 is exemplarily relatively thin, and cracks in the insulator layer 11A relatively largely affect at least one of electrical reliability or mechanical reliability of the capacitor 1. This effectively achieves effects of reduced void density in the insulator layer 11A.

The thickness of the cover 9 in the first range A1 may be ⅛ or more of the thickness of the functional part 7.

In this case, a thickness ratio of the cover 9 to the capacitor 1 is relatively large, so that mechanical reliability of the cover 9 relatively largely influences at least one of mechanical reliability or electrical reliability of the capacitor 1. This effectively achieves effects of reduced void density in the insulator layer 11A.

The capacitor 1 may further include the outer electrode 5. The outer electrode 5 may extend to reach the upper surface and the side surface in the D3 direction of the cover 9, and the side surface in the D3 direction of the functional part 7. The functional part 7 may include the plurality of dielectric layers 17 (exemplifying nonconductor layers) and the plurality of inner electrodes 19 (exemplifying conductors) stacked alternately in the D1 direction. The outer electrode 5 may be bonded to at least part of the inner electrodes 19 on the side surface of the functional part 7, may be joined to the dummy electrode 13 on the side surface of the cover 9, and may be bonded to the base electrode 15 on the upper surface of the cover 9.

As described earlier, this achieves the cover 9 according to any one of the embodiments in an extension of an exemplary step of forming the functional part 7 of a stacked type. The inner electrodes 19 and the outer electrode 5 may be connected directly to each other with no base electrode 15 interposed therebetween on the side surface of the body 3 or the like, so as to reduce electric resistance. Meanwhile, the outer electrode 5 is firmly fixed to the upper surface of the body 3 via the base electrode 15 to improve firmly fix strength. The effects of relatively high void density in the insulator layer 11C effectively act with respect to the improvement in firmly fix strength.

In the embodiments described above, the capacitors 1 and 201 each exemplify an electronic component. The D3 direction exemplifies the first direction. The +D3 side exemplifies the first side. The functional part 7 includes the upper surface exemplifying the first surface. The D1 direction exemplifies the second direction. The cover 9 includes the side surface on the +D3 side, exemplifying the first side surface. The dielectric layers 17 exemplify nonconductor layers. The inner electrodes 19 exemplify conductors. The present disclosure provides a technique that may be implemented in accordance with the above embodiments as well as in various aspects. For example, the above embodiments may be combined as appropriate.

The following concepts may be extracted from the present disclosure. An electronic component includes a functional part and a covering part. The functional part includes a first surface facing a first side in a first direction. The covering part is overlapped with the first surface. The covering part includes one or more insulator layers overlapped with the first surface, and a base electrode overlapped with a surface on the first side of an outermost one of the insulator layers, as well as a first side surface facing a second direction crossing the first direction. The base electrode expands in the second direction to reach the first side surface. The first range is assumed to be equally divided into three portions in the second direction to define a second range adjacent to the first side surface, a third range in a center, and a fourth range not adjacent to the first side surface. In the one or more insulator layers, at least one of the second range or the fourth range is smaller in void density than the third range.

What is claimed is:

1. An electronic component comprising:
a functional part including a first surface on a first side in a first direction; and
a covering part overlapped with the first surface; wherein the covering part includes
at least two insulator layers and at least one dummy electrode overlapped alternately in the first direction, and
a base electrode overlapped from the first side with an outermost one of the insulator layers,
when the covering part includes a first range referring to a range overlapped with the base electrode or the at least one dummy electrode in a plan perspective view in the first direction, and void density refers to a total number of voids per unit area in a cross section along the first direction, an innermost one of the insulator layers is smaller in void density than the outermost one of the insulator layers, in the first range,
wherein
the covering part includes a first side surface facing a second direction crossing the first direction,
the base electrode expands in the second direction to reach the first side surface, and
when the first range is equally divided into three portions in the second direction to define a second range adjacent to the first side surface, a third range in a center, and a fourth range not adjacent to the first side surface, the fourth range and the second range are smaller in void density than the third range, in the at least two insulator layers.

2. The electronic component according to claim 1, wherein
the at least two insulator layers include at least three insulator layers, and
in the first range, at least one of the insulator layers positioned between the outermost one of the insulator layers and the innermost one of the insulator layers is smaller in void density than the outermost one of the insulator layers, and is larger in void density than the innermost one of the insulator layers.

3. The electronic component according to claim 1, wherein
the innermost one of the insulator layers is ¾ or less in void density of the outermost one of the insulator layers, in the first range.

4. The electronic component according to claim 1, wherein
when a void occupation area ratio refers to total areas of voids per unit area in the cross section, the innermost one of the insulator layers is smaller in void occupation area ratio than the outermost one of the insulator layers, in the first range.

5. The electronic component according to claim 1, wherein
the covering part is 25 μm or less in thickness in the first range.

6. The electronic component according to claim 1, wherein
the covering part in the first range is ⅕ or more in thickness of the functional part in the first range.

7. The electronic component according to claim 1, wherein
the base electrode is exposed on a surface of the covering part on the first side,
the at least one dummy electrode is exposed on a first side surface of the covering part, which faces in a second direction intersecting the first direction, and
the innermost one of the insulator layers is located between the functional part and a dummy electrode that is located closest to the functional part among the at least one dummy electrode.

8. The electronic component according to claim 1, wherein
a thickness of the base electrode is not less than twice and not more than twenty times a thickness of each of the at least one dummy electrode.

9. The electronic component according to claim 1, wherein
the base electrode is exposed on a surface of the covering part on the first side, the at least one dummy electrode is exposed on a first side surface of the covering part, which faces in a second direction intersecting the first direction, and the electronic component further comprises an outer electrode that is in contact with the base electrode from the first side, and in contact with the at least one dummy electrode from a side that the first side surface faces.

10. The electronic component according to claim 9, wherein the outer electrode comprises a plated film.

11. The electronic component according to claim 1, wherein the first range is smaller in void density than a region outside the first range, in the innermost one of insulator layers.

12. An electronic component comprising:

a functional part including a first surface on a first side in a first direction; and a covering part overlapped with the first surface; wherein the covering part includes at least two insulator layers and at least one dummy electrode overlapped alternately in the first direction, and a base electrode overlapped from the first side with an outermost one of the insulator layers, when the covering part includes a first range referring to a range overlapped with the base electrode or the at least one dummy electrode in a plan perspective view in the first direction, and a void occupation area ratio refers to total areas of voids per unit area in a cross section along the first direction, an innermost one of the insulator layers is smaller in void occupation area ratio than the outermost one of the insulator layers, in the first range, wherein the covering part includes a first side surface facing a second direction crossing the first direction, the base electrode expands in the second direction to reach the first side surface, and when the first range is equally divided into three portions in the second direction to define a second range adjacent to the first side surface, a third range in a center, and a fourth range not adjacent to the first side surface, the fourth range and the second range are smaller in void occupation area ratio than the third range, in the at least two insulator layers.

13. An electronic component comprising:

a functional part including a first surface on a first side in a first direction; and a covering part overlapped with the first surface; wherein the covering part includes at least two insulator layers and at least one dummy electrode overlapped alternately in the first direction, and a base electrode overlapped from the first side with an outermost one of the insulator layers, when the covering part includes a first range referring to a range overlapped with the base electrode or the at least one dummy electrode in a plan perspective view in the first direction, and void density refers to a total number of voids per unit area in a cross section along the first direction, an innermost one of the insulator layers is smaller in void density than the outermost one of the insulator layers, in the first range, wherein the first range is smaller in void density than a region outside the first range, in the innermost one of insulator layers.

14. The electronic component according to claim 13, wherein the at least two insulator layers include at least three insulator layers, and in the first range, at least one of the insulator layers positioned between the outermost one of the insulator layers and the innermost one of the insulator layers is smaller in void density than the outermost one of the insulator layers, and is larger in void density than the innermost one of the insulator layers.

15. The electronic component according to claim 13, wherein the innermost one of the insulator layers is ¾ or less in void density of the outermost one of the insulator layers, in the first range.

16. The electronic component according to claim 13, wherein the covering part is 25 μm or less in thickness in the first range.

17. The electronic component according to claim 13, wherein the covering part is ⅕ or more in thickness of the functional part in the first range.

18. The electronic component according to claim 13, wherein the base electrode is exposed on a surface of the covering part on the first side, the at least one dummy electrode is exposed on a first side surface of the covering part, which faces in a second direction intersecting the first direction, and the innermost one of the insulator layers is located between the functional part and a dummy electrode that is located closest to the functional part among the at least one dummy electrode.

19. The electronic component according to claim 13, wherein a thickness of the base electrode is not less than twice and not more than twenty times a thickness of each of the at least one dummy electrode.

20. The electronic component according to claim 13, wherein the base electrode is exposed on a surface of the covering part on the first side, the at least one dummy electrode is exposed on a first side surface of the covering part, which faces in a second direction intersecting the first direction, and the electronic component further comprises an outer electrode that is in contact with the base electrode from the first side, and in contact with the at least one dummy electrode from a side that the first side surface faces.

* * * * *